United States Patent [19]
McCormack et al.

[11] Patent Number: 5,541,848
[45] Date of Patent: Jul. 30, 1996

[54] GENETIC METHOD OF SCHEDULING THE DELIVERY OF NON-UNIFORM INVENTORY

[75] Inventors: Michael D. McCormack, Plano, Tex.;
D. Scott Feldman, Anchorage, Ak.;
Chester M. Bowling, Evergreen, Colo.

[73] Assignee: Atlantic Richfield Company, Los Angeles, Calif.

[21] Appl. No.: 356,850

[22] Filed: Dec. 15, 1994

[51] Int. Cl.$^6$ .................................................. G06F 19/00
[52] U.S. Cl. .............................. 364/478.01; 364/401 R; 364/156; 395/13
[58] Field of Search ............................ 364/478, 148, 364/156, 401–403, 468; 395/13

[56] References Cited

U.S. PATENT DOCUMENTS

| | | | |
|---|---|---|---|
| 5,033,004 | 7/1991 | Vandivier, III | 364/468 |
| 5,255,345 | 10/1993 | Shaefer | 395/13 |
| 5,319,781 | 6/1994 | Syswerda | 395/650 |
| 5,343,554 | 8/1994 | Koza et al. | 395/13 |
| 5,390,282 | 2/1995 | Koza et al. | 395/13 |

OTHER PUBLICATIONS

Lawton — "Genetic Algorithms for schedule optimization" — AI Expert—May 1992—pp. 23–27.
Goldberg, "A Gentle Introduction to Genetic Algorithms", *Genetic Algorithms in Search, Optimization, and Machine Learning*, (Addison–Wesley, 1989), pp. 170 et seq.

*Primary Examiner*—Joseph Ruggiero
*Attorney, Agent, or Firm*—Anderson, Levine & Lintel

[57] ABSTRACT

A genetic algorithm method of scheduling the delivery of coal to a series of incoming coal trains is disclosed, where each of the coal trains corresponds to a coal recipient having different premium and penalty rates for energy yield, and possibly also different contaminant specifications. The method is applied to a coal facility having a plurality of bins, where the coal is of varying quality at the various bins, and where the bins are grouped so that loading into trains must be done in succession. According to the disclosed method, a fitness function is generated, with adjustable weighting factors, to combine the premium or penalty revenue with any latency or delay time, as well as moves of the coal loading plow for the series of slots. A randomly selected first generation of assignment sequences are evaluated according to the fitness function, with succeeding generations produced according to genetic techniques, until convergence to the optimum assignment sequence is reached. The method may also be applied to other situations in which non-uniform inventory is to be delivered to recipients having different requirements.

18 Claims, 5 Drawing Sheets

GENETIC METHOD OF SCHEDULING THE DELIVERY OF NON-UNIFORM INVENTORY

This invention is in the field of scheduling, and is more specifically directed to the scheduling of the delivery of non-uniform inventory from selected sites, as encountered in the coal mining industry.

BACKGROUND OF THE INVENTION

In the field of distribution of materials or goods, one often encounters the situation where certain qualities of the material or goods to be delivered vary from lot to lot, and where different parties receiving the materials or goods may have different requirements for these certain qualities. These qualities are often associated with the price that is charged, such that higher quality goods are generally priced higher than are lower quality goods. In order for a business to maximize its revenue, it must continually ensure that the materials or goods of varying quality are delivered to the right customers for those goods.

The coal mining business is one business in which the problem of maximizing revenue by selection of the quality of coal to be delivered to various customers is especially complex and limited. Referring to FIG. 1, a coal delivery facility is illustrated as an example of this problem. In this exemplary facility, a railroad track 10$i$ is an incoming track along which empty coal trains travel to the facility, and which serves two sets of "bins", or locations at which coal may be loaded. Track 10$i$ splits into a track 10$a$ and a track 10$b$ corresponding to these two groups of bins. In this example, track 10$a$ travels near a series of slots $4_0$ through $4_5$ in a coal receiving facility 2; each of slots $4_0$ through $4_5$ have a pile of coal located thereat, from which a train may be loaded through use of plow 6. Plow 6 is a conventional coal loading apparatus that moves coal from the associated pile through the slot 4 into the train. Track 10$b$, on the other hand travels near silos $8_0$ and $8_1$, each of which stores a load of coal that may be loaded into a coal train along track 10$b$. Each bin (i.e,. each of slots 4 and silos 8) stores a full trainload of coal, with a trainload corresponding to approximately 100 boxcars in volume.

In this exemplary coal delivery facility, as is typical for coal delivery facilities, the quality of the coal located at each slot 4 or silo 8 differs from the quality of the coal located at the other bins. For purposes of this example, the quality of coal corresponds to its energy yield (e.g., in BTu/pound) and to the various levels of both contaminants (e.g., sulfur) and desirable chemicals (e.g., sodium). This variation in quality among bins (i.e, among slots 4 and silos 8 of FIG. 1) is due to the differing quality of coal located at different portions of a coal mine, such as an open pit coal mine.

Also as is typical in the business, incoming empty coal trains are generally associated with a particular customer, so that the coal is picked up at the delivery facility of FIG. 1 for delivery at a customer's location. Each customer generally has specific requirements for the energy yield of the coal that it receives. It is typical in the business that a customer will pay premiums at a specified rate if it receives coal having an energy yield above a particular baseline range, and pays at a reduced rate if it receives coal at an energy yield below the baseline range. The schedule of premiums and rebates may be considered as a function of energy yield in the manner illustrated, for three hypothetical examples, in FIG. 2.

In a first premium/penalty function illustrated by plot 12 in FIG. 2, the customer pays at a baseline rate for coal having between 8450 and 8550 BTu/lb, and pays at a premium of 0.04¢/ton for each BTu/lb above 8550 BTu/lb, up to a maximum premium of 5¢/ton (achieved at a yield of 8675 BTu/lb); the customer also pays at a reduced rate of 0.02¢/ton for each BTu/lb below 8450 BTu/lb, down to a minimum yield of 1250 BTu/lb below which the customer will not accept the coal (i.e., the price is zero). By way of example, a second premium/penalty function illustrated by plot 13 has a baseline range (8500 to 8650 BTu/lb) that is shifted from that of the function of plot 12, with different slopes of premium and penalty, and with no maximum premium or minimum yield threshold. A third premium/penalty function is illustrated by plot 14 of FIG. 2, in which the baseline range extends from 8400 to 8600 BTu/lb, and in which the premiums and penalties are 2¢ step functions over 100 BTU/lb ranges on either side of the baseline range.

The operator of the exemplary coal distribution facility of FIG. 1 of course wishes to maximize the premiums received and to minimize the penalties assessed. As such, the operator will sample the coal located at the various bins for laboratory analysis of its energy yield, as well as its contaminants and desired chemicals, and use this analysis in the assignment of a series of incoming trains to the various bins.

The optimization of income quickly becomes a complex problem, however, especially in the worst case where eight incoming trains are associated with eight different premium/penalty functions, and where the coal in the eight possible bins (slots 4 and silos 8) varies in yield. Consideration of these functions illustrated by plots 12, 13, 14 clearly indicates the problem of maximizing the premiums paid from non-uniform inventory sources, such as the coal facility of FIG. 1, especially since the baseline ranges of the functions can differ from one another, not only in center point (BTU/lb) but also in width, and since the premium and penalty slopes are not the same for each of the functions. Estimation of the optimum loading sequence is therefore not a trivial operation for a human operator.

By way of further background, calculus-based optimization techniques have been applied in the past to the coal mine scheduling problem of FIGS. 1 and 2. According to this technique, also referred to as the "hill-climbing" method, the gradient of a point on the function under analysis is evaluated, and a next point of analysis is selected by moving an incremental distance in a direction indicated by the derivative (i.e., when seeking a maximum, the increment is taken in the direction with the positive gradient). As is well-known in the art, these methods are vulnerable to local extrema which can trap the optimization routine at a point that is not the true maximum for the function. In addition, this technique does not handle functions with infinite derivatives (i.e., at steps in the function). As shown in FIG. 2, step function changes in the premium/penalty function can be quite common. As such, the application of the calculus-based technique to the optimization of the coal delivery facility problem was not successful.

Furthermore, as noted above, the decision process for assigning incoming coal trains to particular slots 4 or silos 8 also involves other factors than the energy yield of the coal inventory. One such factor is the presence of contaminants, such as sulfur, moisture, and ash, for which the coal customers will have maximum values, and will refuse acceptance of coal shipments that exceed these specifications for any of the specified contaminants. Because of different uses and environmental constraints, however, it is common that different coal customers will have different contaminant specifications. The consideration of which incoming coal train is to be assigned to which bin of the coal delivery facility thus further complicates the optimization of revenue.

Another complicating factor in the example of the coal delivery facility of FIG. 1 is the sodium requirement that may be specified by some customers. It is common for coal customers to require that a certain amount of sodium be present in the delivered coal, for purposes of minimizing the buildup of contaminants in their coal burning facilities; this requirement may also vary from customer to customer. If the laboratory analysis indicates that the sodium content of the coal in a particular bin is below the desired level, the coal facility can add a chemical to increase the sodium content; an example of this chemical is commonly referred to in the art as "Trona". Trona is quite costly, however (e.g., on the order of $130/ton), and as such any optimization of revenue should also consider minimizing the use of Trona by assigning incoming trains having less stringent sodium specifications to the lowest sodium bins.

Yet another complicating factor in the optimization routine is the timing of the loading of the incoming trains. Coal carriers typically specify a penalty if the train leaves the coal delivery facility late. In the example of FIG. 1, which is typical of a coal delivery facility, only one train can be loaded from slots 4 at a time, and only one train can be loaded from silos 8 at a time; furthermore, the loading from a slot may take longer (e.g., on the order of three hours) than loading from a silo (e.g., on the order of one hour). Further complicating the timing of this operation is the movement of plow 6 which is used to load coal from a bin 4 to a train, as plow 6 moves quite slowly among slots 4, and also disrupts the coal as it often drags some coal from one slot to another. Consideration of these timing issues in the revenue optimization also greatly complicates the problem.

Indeed, calculus-based optimization techniques such as the hill-climbing technique are generally unable to handle optimization of a function having differing input types (e.g., energy yield vs. contaminant specifications vs. timing penalties), at least without definition of a rigorous differentiable function relating these different input types.

By way of further background, optimization methods known as "genetic algorithms" have been applied to scheduling problems. As is well known in the art, genetic algorithms serve to select a string (referred to as a "chromosome") of digits ("genes") having values ("alleles") that provides the optimum value of a "fitness function". According to this technique, a group of chromosomes ("a generation") is first randomly generated, and the fitness function is evaluated for each chromosome. A probability function is then produced to assign a probability value to each of the chromosomes according to its fitness function value, so that a chromosome with a higher fitness function value obtains a higher probability. A "reproduction pool" of chromosomes is then produced by random selection according to the probability function; the members of this reproduction pool are more likely to be selected from the higher fitness function values. Each chromosome from the reproduction pool then "reproduces" with another, randomly selected, chromosome in the reproduction pool by exchanging genes at a randomly selected "crossover" point in the chromosome; this reproduction results in the second generation of chromosomes. Mutation may be introduced by randomly altering a small fraction of the genes in the second generation (e.g., one in one thousand). The fitness function is then evaluated for each of the chromosomes in the second generation, and the reproduction process is repeated until the desired convergence is obtained.

An example of the use of a genetic algorithm in a scheduling problem is described in U.S. Pat. No. 5,319,781, issued Jun. 7, 1994.

It is therefore an object of the present invention to provide a method of optimizing the distribution of non-uniform inventory in an efficient manner.

It is a further object of the present invention to provide such a method in which the optimization considers functions having infinite gradients.

It is a further object of the present invention to provide such a method in which the optimization considers inputs and effects of inputs of different types.

It is a further object of the present invention to provide such a method in which the distribution of the non-uniform inventory is made according to a sequence of varying requirements.

Other objects and advantages of the present invention will be apparent to those of ordinary skill in the art having reference to the following specification together with its drawings.

SUMMARY OF THE INVENTION

The present invention may be implemented into an automated system for scheduling the sequential delivery of inventory from a plurality of locations to a plurality of recipients having differing demand functions, where the inventory located at the various locations is of differing quality. Information regarding the recipients' demand functions and the quality of the inventory at the plurality of locations is stored in computer memory. The demand functions, along with certain internal functions, are used to produce a fitness function. A genetic algorithm is then used to maximize the fitness function for the sequence in which the inventory is to be delivered to the recipients.

DETAILED DESCRIPTION OF THE PREFERRED EMBODIMENT

Figure 2:
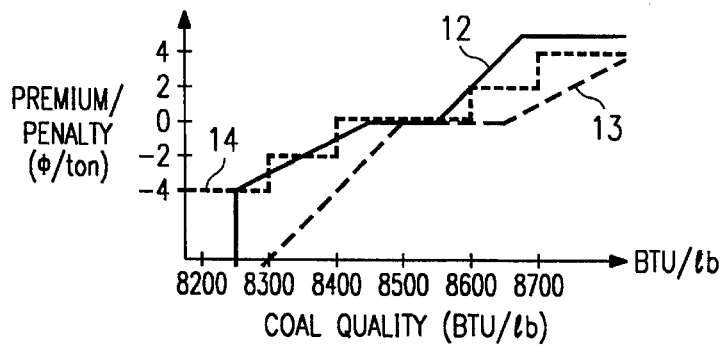
FIG. 2 is a plot of various premium/penalty functions for the demand of coal from the facility of FIG. 1.
Figure 3:
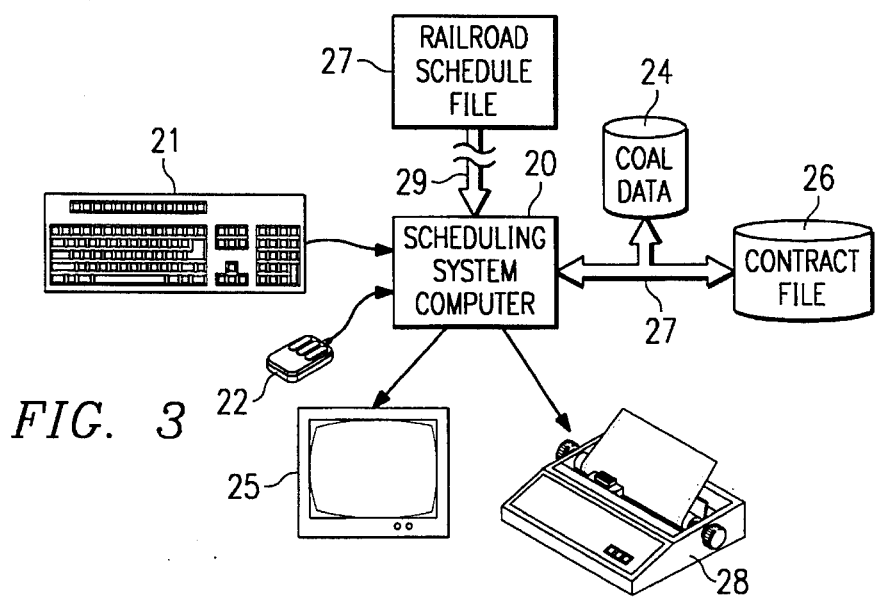
FIG. 3 is a block diagram of an automated system for scheduling delivery according to the preferred embodiment of the invention.

Referring now to FIG. 3, an automated system for scheduling delivery of non-uniform inventory according to the preferred embodiment of the invention will now be described in detail. In this example, the preferred embodiment of the invention is applied to the problem of FIG. 1 regarding the delivery of coal to incoming coal trains that have different specification requirements, such as different premium/penalty functions as illustrated in FIG. 2. Of course, it is contemplated that the present invention may be applied to different instances of the problem of sequential delivery of non-uniform inventory to recipients having differing criteria, within the scope of the present invention.

As shown in FIG. 3, the system of the preferred embodiment of the invention includes scheduling system computer 20. System computer 20 may be implemented by any conventional personal computer or workstation, preferably an IBM®-compatible personal computer having least a 286-class central processing unit; of course, higher performance CPU-based computers will be preferable. According to the preferred embodiment of the invention, system computer 20 is capable of presenting output onto graphics display 25 and printer 28. Keyboard 21, mouse 22, are also provided with system computer 20, for interactive operation in the manner described hereinbelow. System computer 20 further includes bus 27, by way of which it is able to communicate with disk storage devices, including external hard disk storage on a network and floppy disk drives. In this embodiment of the invention, bus 27 communicates data to system computer 20 from coal analysis floppy disk storage 24 and from contract specification data hard disk storage 26. System computer 20 is also connected to a communications network link 29, to receive data from railroad schedule storage 27 at a remote computer.

Figure 4:
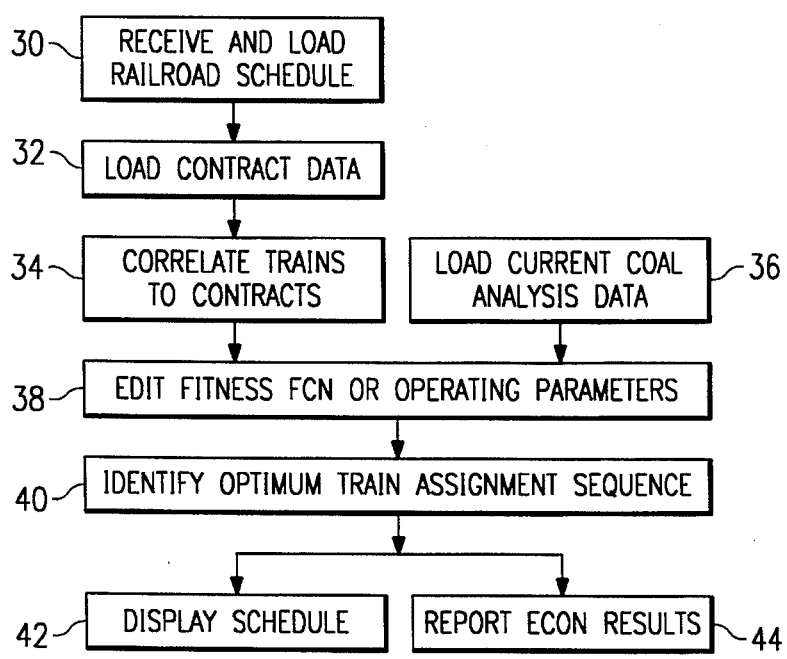
FIG. 4 is a flow chart illustrating the overall operation of the method according to the preferred embodiment of the invention.

Referring now to FIG. 4 in combination with FIG. 3, the operation of system computer 20 in performing the preferred embodiment of the invention will now be described in detail. This description will use the exemplary problem described above in which incoming coal trains with different specification requirements and premium/penalty functions are to be routed to various coal bins in the coal delivery facility of FIG. 1 in such a manner as to maximize revenue. According to this embodiment of the invention, scheduling may be carried out on a daily basis, to define the optimal sequence in which incoming trains are assigned to particular coal bins (slots 4 and silos 8). Of course, the process may also be performed for each shift within a day, or updated as necessary (e.g., if the railroad schedule changes due to unforeseen delays).

Scheduling according to this embodiment of the invention begins with processes 30, 32, in which information regarding the recipients of the coal are identified. In process 30, system computer 20 interrogates the remote computer containing the current railroad schedule data 27, and receives the current schedule over communications network link 29. Process 30 thus loads system computer with the identification of each of the trains due to arrive at the coal delivery facility in the next shift or day (i.e., the "subject time period"), and the estimated times of arrival for those trains. In process 32, system computer 20 loads data from contract specification data hard disk storage 26 for those trains identified as due to arrive in the subject time period, as identified by the schedule data retrieved in process 30; this data includes the premium/penalty functions described hereinabove relative to FIG. 2, as well as other specification limits such as minimum sodium levels and maximum contaminant concentrations. In process 34, system computer 20 then correlates the contract information from process 32 to each of the incoming trains identified in process 30, so that the correct premium/penalty function and specification limits are associated with each of the incoming trains.

Process 36 loads system computer 20 with the chemical and energy analysis data for the coal currently located at each of slots 4 and silos 8; this process is performed by system computer receiving and loading analysis data from coal analysis disk storage 24 of FIG. 3. As is known by those in the field, the analysis data loaded in process 36 is obtained by sampling of the coal at the various bins, and by conventional chemical analysis at an on-site laboratory. In addition, it is preferred that the current location of plow 6 also be communicated to system computer 20 by process 36. All of this data may be communicated to system computer 20 by way of a computer network, as suggested by FIG. 3; alternatively, floppy disks or other conventional communications techniques may be used. As suggested by FIG. 4, the relative time sequence of process 36 relative to processes 30, 32, 34 is unimportant.

Figure 7:
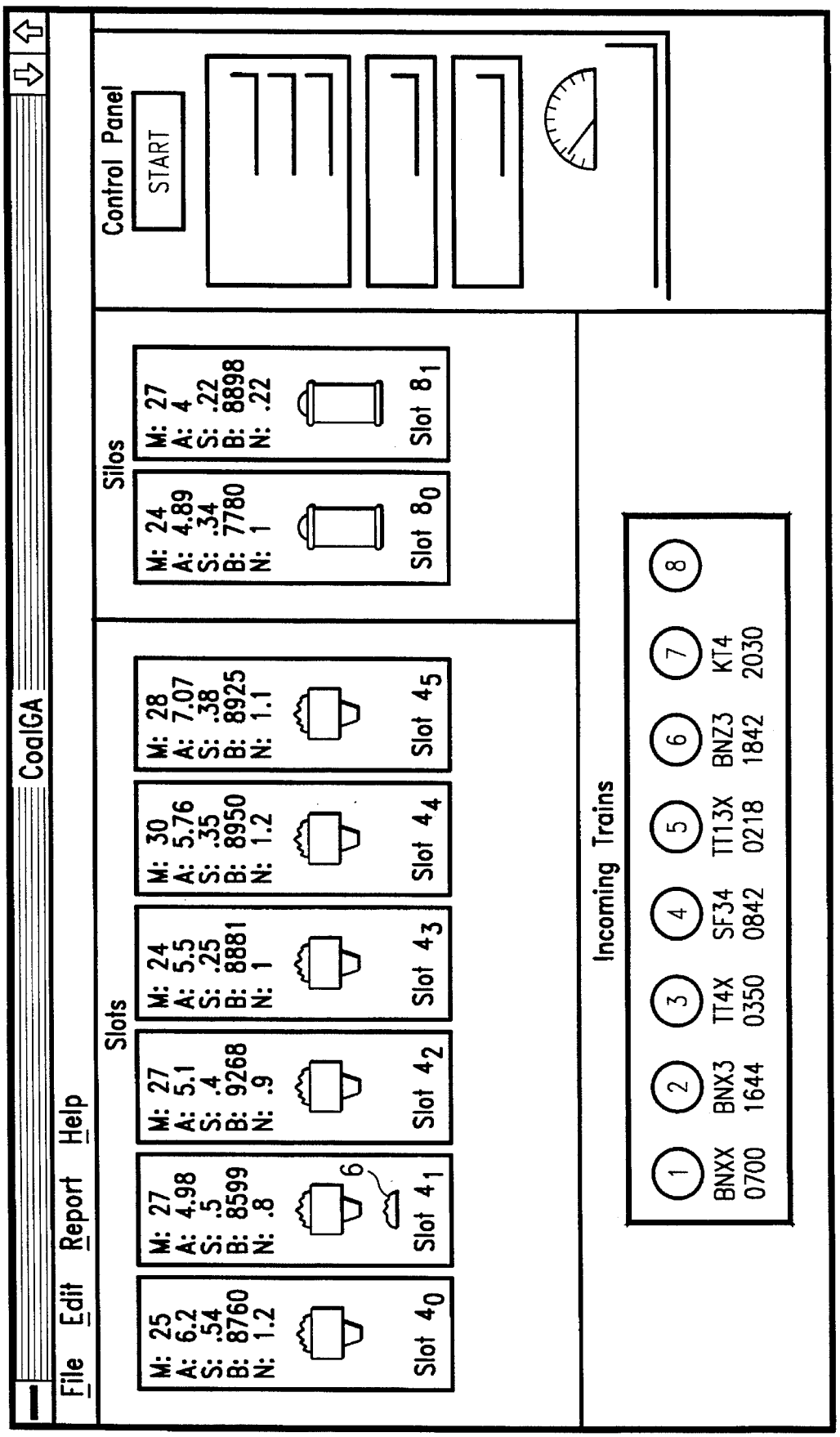
FIGS. 7, 8 and 9 are examples of input screens used in the control of the preferred embodiment of the invention.

FIG. 7 is an illustration of an exemplary display screen presented by system computer 20 upon completion of process 36. As evident from the portion of the display of FIG. 7 labeled "Incoming Trains" seven incoming trains have been identified from process 30 (FIG. 7 shows the train number and the estimated time of arrival); since eight bins are available, this embodiment of the invention is able to handle the assignment of eight incoming trains. Of course, other information such as date of arrival may also be displayed for the incoming trains. Also as shown in FIG. 7, system computer 20 indicates the analysis data for the coal in each of the eight bins of the facility (i.e., slots 4 and silos 8). In this example, the analysis data includes moisture (M), ash (A), sulfur (S), energy content in BTU/lb (B), and sodium (N). In addition, the display screen of FIG. 7 indicates the current position of plow 6 (which, in this example, is slot $4_1$). The human operator may also change the position of plow 6 among the bins, by manipulation of mouse 22.

In process 38, the operator of system computer 20 may edit the fitness function and also certain operating parameters to be used in the optimization process. By way of definition, a "sequence" is a possible assignment of incoming trains to slots 4 and silos 8. An example of such a sequence is illustrated in the following Table, for a full complement of eight incoming trains:

TABLE

| Incoming Train Number | Slot or Silo Assignment |
|---|---|
| 1 | $4_3$ |
| 2 | $8_1$ |
| 3 | $4_2$ |
| 4 | $4_5$ |
| 5 | $8_0$ |
| 6 | $4_0$ |
| 7 | $4_1$ |
| 8 | $4_4$ |

As will be evident hereinbelow, the fitness function is the expression by way of which sequences of trains to bins will be evaluated. Operating parameters, on the other hand, are those parameters that reflect certain assumptions in the evaluation process.

According to this embodiment of the invention, the fitness function is a weighted sum of various factors that are to be considered when evaluating train-to-slot assignment sequences. As discussed above relative to FIG. 2, evaluation of the premium/penalty function is, of course, one such factor. A second factor is the latency time of a particular sequence, which is the total time that incoming trains must wait upon arrival at the facility prior to being directed to a specific slot 4 or silo 8. Latency time arises in the situation of FIG. 1, since only a single train may reside on either of tracks 10a, 10b; if an incoming train arrives at the facility while a previous train is still being loaded, the incoming train must wait until the previous train leaves the particular one of tracks 10a, 10b. According to this example, a third factor is the number and distance of moves of plow 6 in the sequence. As noted above, movement of plow 6 requires significant time, and also can result in mixing and contamination of coal at slots 4.

According to this example, therefore, the fitness function value FFV for a single assignment sequence for eight incoming trains is defined as follows:

$$FFV = W_1 * \sum_{t=1}^{8} PP_t + W_2 * \sum_{t=1}^{8} f(LT_t) + W_3 * \sum_{t=1}^{8} g(PM_t) \quad (1)$$

where $W_1$, $W_2$, $W_3$ are unitless weighting factors. In equation (1), for a particular incoming train t, $PP_t$ is the value of the premium/penalty function if coal were loaded into train t from the assigned slot 4 or silo 8. As such, the sum of the $PP_t$ values for a particular sequence is the sum of the premiums and penalties that would accrue over the entire sequence of eight incoming trains if assigned according to the sequence. This would be calculated by applying the particular BTU/lb value from each of slots 4 and silos 8 to the premium/penalty function corresponding to the incoming train assigned to that slot 4 or silo 8 in the sequence.

Also in equation (1), $LT_t$ is the time that train t must wait (for completion of the loading of a prior train) for its assigned slot 4 or silo 8 upon its arrival at the coal facility, and $PM_t$ is the number of slots 4 that plow 6 must move in order to load train t at its assigned slot 4. The functions $f(LT_t)$ and $g(PM_t)$ are functions that may be defined in setting the fitness function; for example, a function as simple as:

$$f(x)=g(x)=x \quad (2)$$

may be used. Alternatively, more complex functions of latency time and plow moves may be used, for additional accuracy if appropriate to the particular facility. In any case, since high values of both latency time and plow moves are undesirable, the weighting factors $W_2$, $W_3$ will be negative constants.

Figure 8:
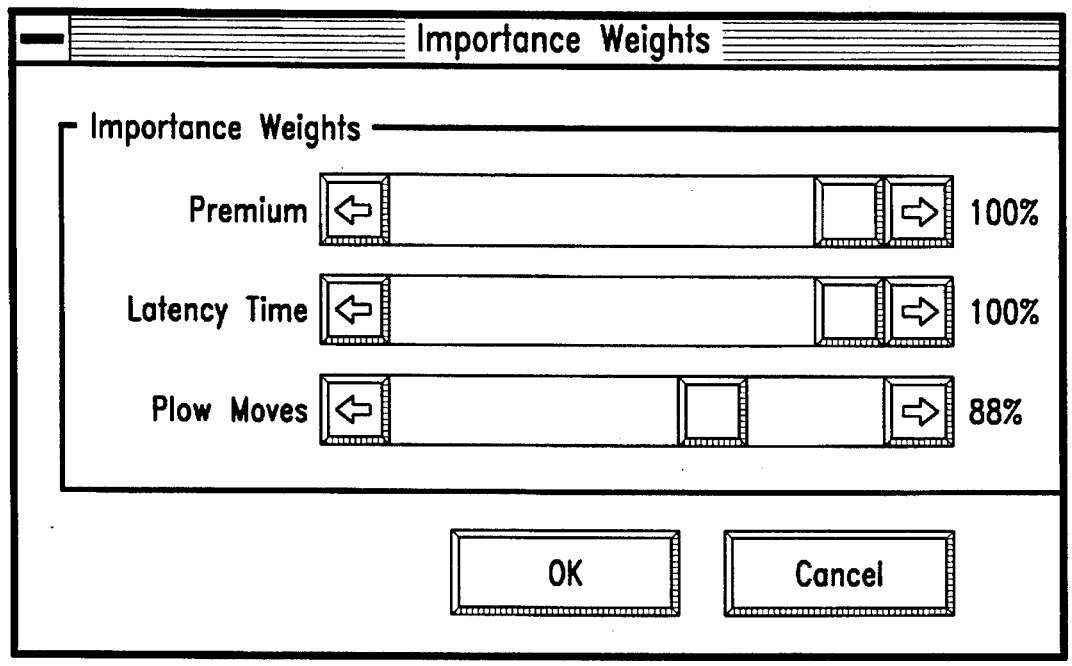

Referring to FIG. 8, a display screen by way of which an operator may control system computer 20 in process 38 to adjust the weighting factors $W_1$, $W_2$, $W_3$ in fitness function equation (1). The screen of FIG. 8 may be accessed by way of a pulldown "edit" menu or the like, from the display of FIG. 7. In this example, the user is able to adjust the position of the slide bar for each of the values labeled "Importance Weights", such that each value may range from 0 to 100% importance. The Importance Weight labeled "Premium" corresponds to weighting factor $W_1$ in the fitness function, while the Importance Weights labeled "Latency Time" and "Plow Moves" correspond to weighting factors $W_2$, $W_3$, respectively. Higher importance ratings will cause weighting factors $W_2$, $W_3$ to become more negative, while a higher importance rating will make weighting factor $W_1$ more positive.

Figure 9:
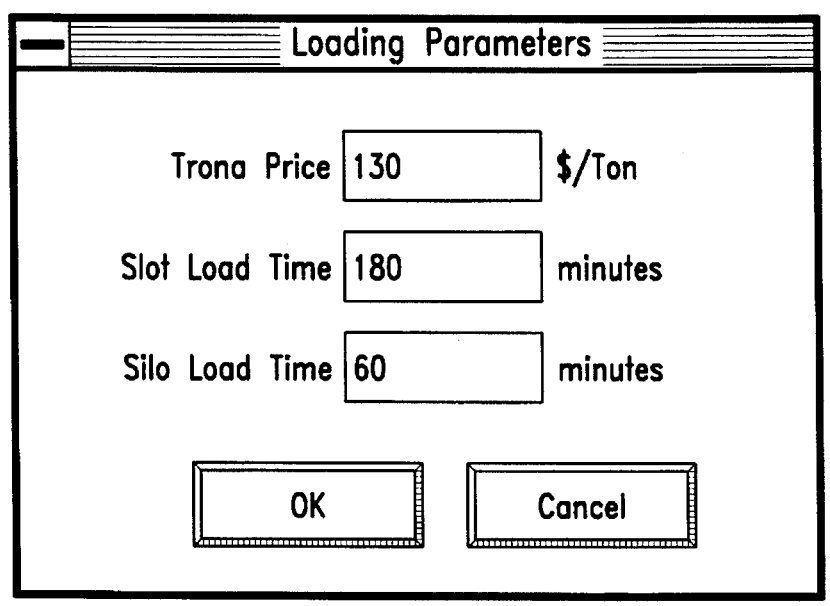

Regarding the editing of operating parameters, process 38 may be used to eliminate one or more of the incoming trains or one or more of the coal bins from consideration in the optimization process, or may assign a specific incoming train to a specific coal bin. In addition, the location of plow 6 may be altered in process 38, for example to reflect a move of the plow for maintenance or other reasons prior to the arrival of the first incoming train. Referring to FIG. 9, additional examples of operating parameters that may be edited in process 38, for example by way of a pulldown edit menu from the display of FIG. 7, are shown. These operating parameters correspond to the cost per ton of the additive Trona, and to the loading times for slots 4 and silos 8. Process 38 thus allows the human operator to adjust these parameters as well, for accuracy relative to the particular construction of the coal deliver facility.

Figure 5:
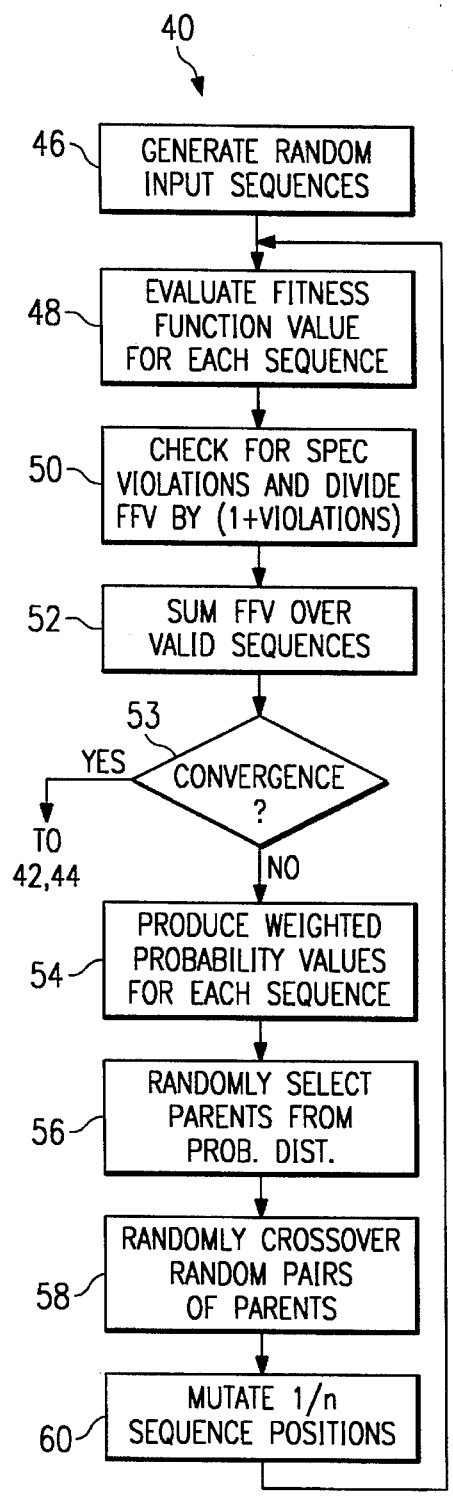
FIG. 5 is a flow chart illustrating the genetic portion of the method of the preferred embodiment of the invention.

The scheduling method then continues with process 40, in which the optimum assignment sequence is identified. According to the preferred embodiment of the invention, process 40 incorporates the use of a "genetic algorithm" to identify the optimum sequence. As will become apparent from the following description, the genetic algorithm is useful in that it avoids the necessity of evaluating all possible assignment sequences which, in the case of eight incoming trains, would be 40,320 evaluations. Referring now to FIG. 5, the operation of process 40 will now be described in detail.

Figure 1:
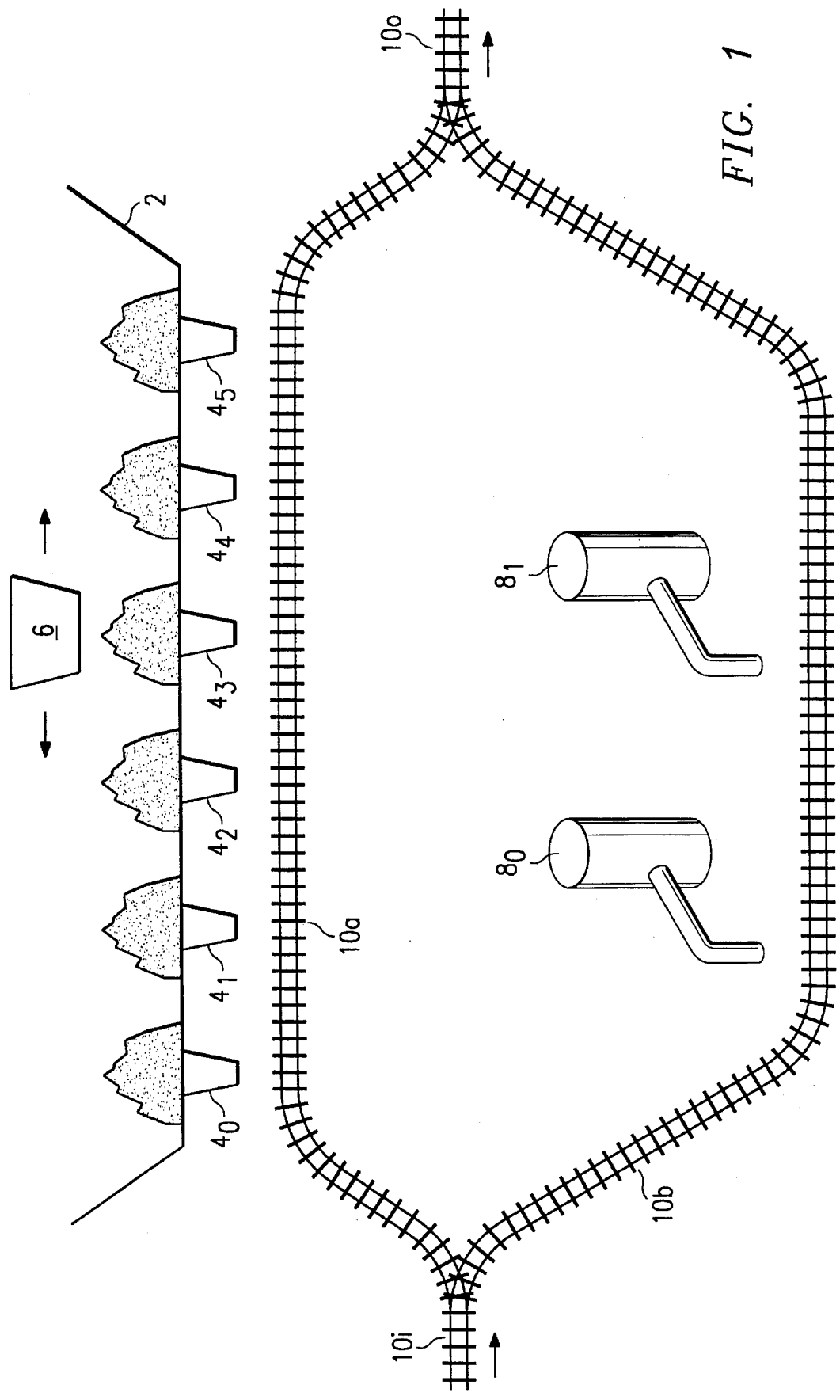
FIG. 1 is a schematic diagram of a coal delivery facility relative to which the preferred embodiment of the invention may be implemented.

Process 40 begins with the random generation of a number of initial sequences in process 46; in the example of FIG. 1, thirty such sequences are randomly selected, and become the "first generation" of the genetic algorithm. These sequences will each consist of a string of numbers that correspond to slot 4 and silo 8 positions, with each digit position corresponding to an incoming train number (see FIG. 7). For example, the sequences may correspond the digit positions to the eight incoming trains from left to right, such that the left-most digit position corresponds to incoming train #1, and the right-most digit position corresponding to incoming train #8. Numeric values 1 through 8 are then assigned to slots $4_0$ through $4_5$ and silos $8_0$, $8_1$, respectively (i.e., 1=slot $4_0$, 2=slot $4_1$, . . . 7=silo $8_0$, and 8=silo $8_1$). In this arrangement, the string:

4 8 3 6 7 1 2 5 would correspond to the sequence example in the Table hereinabove. It should be noted that assignment of numeric values to bin positions rather than to incoming trains facilitates the scheduling method when fewer than eight incoming trains are to be scheduled for assignment to the eight bins.

Figure 6:
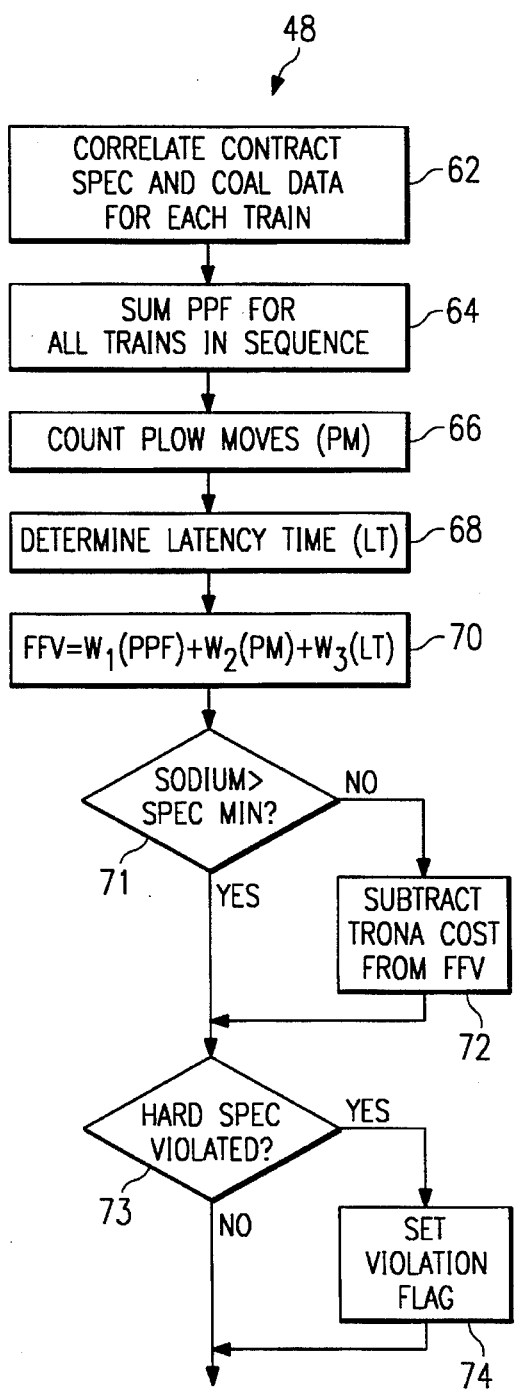
FIG. 6 is a flow chart illustrating the method of evaluating the fitness function in the preferred embodiment of the invention.

Following selection process 46, process 48 is next performed, in which the fitness function value FFV is determined for each of these randomly selected sequences using the weighting factors $W_1$, $W_2$, $W_3$ as edited in process 38, which is illustrated in detail in FIG. 6 for a single sequence.

Process 48 begins with process 62 in which, for each train-to-bin assignment in the sequence, the contract specification data (including premium/penalty function) for the incoming train is correlated with the coal data for its assigned slot 4 or silo 8. Process 64 is then performed in which the premium/penalty function ($PP_t$) for each assignment is calculated and summed. According to this embodiment of the invention, process 64 reads the BTU/lb value from the coal data for each particular bin, and applies it to the premium/penalty function (examples of which are shown in FIG. 2) for the incoming train assigned to that bin in the sequence; process 64 then performs a signed sum of all of the $PP_t$ values for the train-to-bin assignments in the sequence. In other words, process 64 determines the premium or penalty revenue that would be realized if the incoming trains were actually assigned to the bins as indicated by the sequence.

Following process 64, the number of plow moves is determined in process 66. As noted above, a plow move occurs when plow 6 of FIG. 1 moves a single location among slots $4_0$ to $4_5$. For example, movement of plow 6 from slot $4_2$ to slot $4_4$ would be two plow moves ($4_2$ to $4_3$, and $4_3$ to $4_4$). The value PM thus is determined in process 66 by summing, over the sequence, the plow moves $PM_t$ necessary to load each train t. For example, in the sequence of the Table hereinabove, a total of thirteen plow moves would take place (i.e., PM=13). Similarly, in process 68, the total latency time LT is determined by summing, over the sequence, the time $Lt_t$ that each train t has to wait prior to being assigned to its slot 4 or bin 8 in the sequence, considering the arrival times of the trains and also considering the time required to load a train from a slot 4 or silo 8 (as edited in process 38).

Process 70 is then performed for the sequence to create the fitness function value FFV by performing the weighted sum of equation (1) hereinabove, using the results of processes 66, 68, 70 and the weighting factors $W_1$, $W_2$, $W_3$ set in editing process 38. Since weighting factors $W_2$, $W_3$ are negative, process 70 may return either a positive or a negative value for the fitness function value FFV for a sequence.

Decision 71 then determines which of the train-to-bin assignments in the sequence would require the addition of the Trona additive to raise the sodium content of the coal to an acceptable level. Decision 71 is performed by comparing, for each of the train-to-bin assignments in the proposed sequence, whether the coal in the slot 4 or silo 8 meets the minimum specification under the contract for the associated incoming train. If the sodium specification is met in all cases, control passes to decision 73. If one or more of the train-to-bin assignments would violate the minimum specification for the contract, the cost of Trona required to bring all of the assignments up to specification would be calculated in process 72, and subtracted (after multiplication by a weighting factor, if desired) from the FFV for that sequence.

In either case, decision 73 is next performed to determine, for each train-to-bin assignment in each of the sequences, whether any of the "hard" contract specifications would be violated by assigning its train to the slot 4 or silo 8 indicated in the assignment sequence. For purposes of this description, a "hard" specification is a contract specification that must be met in order for the coal to be at all accepted by the customer (as opposed to a premium/penalty function, in which substandard coal is accepted, but at a lower price). For example, if one of the incoming trains were associated with a contract that specified that the moisture content must not exceed 26%, assignment of this incoming train to a slot 4 or silo 8 having coal with greater than 26% moisture content would violate the specification. For each sequence in which a specification would be violated, a violation flag is set in process 74. Whether or not any specifications are so violated, process 48 is complete for the sequence.

Process 48 is so performed for each of the sequences generated in process 46, with the results stored in the memory of system computer 20.

After completion of process 48 for all of the proposed sequences, process 50 is then performed by interrogating the violation flag for each of the sequences. For each sequence having a violation flag indicating that a "hard" specification has been violated, its fitness function value FFV is downgraded from its raw value ($FFV_{raw}$) according to the number of specification violations (VIOL) as follows:

$$FFV = \frac{FFV_{raw}}{VIOL + 1}$$

Accordingly, the fitness function value FFV is significantly downgraded for violations of one or more "hard" specifications.

Process 52 is then performed to create a global sum of the FFVs to assist in the convergence determination, and also as useful in producing the next generation of sequences, if necessary. The global sum for this example is produced in process 52 by summing the fitness function values FFV for all sequences, after processing by process 50.

Decision 53 is then performed to determine if process 40 has converged to an optimum sequence. Convergence may be determined in one of several different ways according to the preferred embodiment of the invention. For example, the value of the global sum produced in process 52 may be compared against the global sum produced for the prior generation, with convergence indicated by an insubstantial difference therebetween. Alternatively, the highest fitness function value FFV obtained in the generation, and the number of sequences that have this FFV, may also be considered in the convergence decision 53 (i.e., convergence will be present if many of the sequences are alike and have the highest FFV). Further in the alternative, the convergence decision 53 may merely compare the number of generations produced against a run limit (for example, a run limit that is determined by characterization), in which case convergence is merely assumed upon completion of the run limut number of generations.

If convergence is reached, control passes to output processes 42, 44, as will be described hereinbelow. On the other hand, if decision 53 determines that the optimization of process 40 has not adequately converged, another generation of sequences is to be generated, beginning with process 54.

As indicated above, the global sum of FFVs produced in process 52 is useful in producing the next generation of sequences. According to genetic algorithm techniques, succeeding generations of sequences (or "chromosomes") are randomly selected from the prior generation according to a probability function that affords greater likelihood of selection to sequences having higher fitness function values FFV. Conversely, the likelihood of selecting a low fitness function value sequence is to be relatively low. According to the preferred embodiment of the invention, the probabilities of selection are determined in process 54 by determining the percent contribution to the global sum of the fitness function values from each of the sequences evaluated in process 48.

By way of example, if the following arrangement of sequences and fitness function values were the four highest ranked sequences in a generation, where five incoming trains are to be assigned to the eight possible bin positions (i.e., the string lengths are five, with digits ranging from 1 to 8 for the eight possible bin positions):

| 7 3 8 4 2 : | FFV = 3.45 |
|---|---|
| 6 7 8 5 1 : | FFV = 2.80 |
| 3 7 1 2 4 : | FFV = 2.21 |
| 8 6 3 2 1 : | FFV = 1.70 | and if the global sum determined in process 52 was 12.54, the probabilities determined for these sequences in process 54 would be as follows:

| 7 3 8 4 2 : | probability = 0.275 |
|---|---|
| 6 7 8 5 1 : | probability = 0.223 |
| 3 7 1 2 4 : | probability = 0.176 |
| 8 6 3 2 1 : | probability = 0.136 |

In this case, the cumulative probability for the remaining sequences would be approximately 0.190.

Following assignment of the probabilities in process 54, reproduction candidate sequences, or "parents", for the next generation of sequences to be produced are selected in process 56. According to this embodiment of the invention, the number of parents selected in process 56 equals the number of sequences originally generated in process 46; in this example, thirty such parent sequences will be selected. The parent sequences are selected from the set of valid sequences for which probabilities are calculated in process 54, preferably in a random manner but according to the probabilities calculated in process 54. This ensures that sequences with higher fitness function values FFV are thus more likely to become parents for the succeeding generation; as such, the genetic algorithm models the theory of natural selection.

After selection of the parent sequences in process 56, reproduction process 58 is performed to produce the next generation of sequences, by randomly selecting pairs of parent sequences and performing a "crossover" operation at a randomly selected position within the sequences, thus creating new sequences for evaluation. A rudimentary crossover operation of process 58 on a pair of sequences, or strings of digits, will now be explained by way of example. Consider the example where the following two sequences were selected in process 58 as one pair of parents of the next generation (from the population of parents determined by process 56):

```
          6 7 8 5 1
          3 7 1 2 4
```

Process 58 would produce two "offspring" sequences for the next generation by randomly selecting a crossover point, and by then swapping the digits on one side of the crossover point with those digits from the other parent sequence. Using the above example, if the crossover point were at the position between the second and third digits, crossover would occur as follows:

| Before crossover | After crossover |
|---|---|
| 6 7 : 8 5 1 | 6 7 : 1 2 4 |
| 3 7 : 1 2 4 | 3 7 : 8 5 1 |

It should be noted that it is likely for crossovers to result in invalid sequences, namely those in which a single slot 4 or silo 8 is assigned to two different incoming trains. In the above example, such invalid sequences would occur if the crossover points were between the third and fourth digits (as one of the sequences after crossover would have had two 1's, corresponding to slot $4_0$ loading two different incoming trains). Process 58 would discard such results, and randomly select another pair of parent sequences and crossover point, and perform the reproduction process again, until the desired number of sequences resulted.

Other types of crossover techniques known in the art may alternatively be used. A preferred crossover technique is known as "PMX crossover", and is described in Goldberg, *Generic Algorithms in Search, Optimization and Machine Learning* (Addison-Wesley, 1989), pp. 170 et seq.

It is known in the genetic algorithm field that "mutations" are useful to avoid trapping of the optimization at a local maximum, as such mutations encourage diversity in the offspring. Accordingly, in this embodiment of the invention, process 60 performs a mutation upon the sequences of process 58, by changing, to a different value, every $n^{th}$ digit generated. For example, every $1000^{th}$ digit may be switched with another digit in the same sequence in process 58. In this example hereinabove, where thirty sequences of five digits each constitute a generation and where every $1000^{th}$ digit is to undergo mutation, a mutation would occur once in every seven generations.

Following the completion of process 58, a new generation of new sequences has been produced and is ready for evaluation via process 48. The evaluation of the fitness function values FFV for this new generation is then performed, and the process continued until decision 53 determines that convergence to an optimal sequence has occurred. Output process 42 then presents a visual display to advise the human operator of the optimal assignment of incoming trains to slots $4_0$ through $4_5$ and silos $8_0$, $8_1$. Those slots 4 and silos 8 for which Trona additive is required will also be indicated, so that the appropriate action may be taken. Output process 44 may also be performed to produce a printed hard copy report of the assignment of incoming trains to the bins of the facilities. In addition, each of output processes 42, 44 may provide an economic analysis for the optimal assignment, including the amount of premiums obtained by the particular assignment, as well as the number of plow moves and the latency time involved in the assignment.

Following the optimization provided by the present invention, the coal facility then routes the incoming trains to the appropriate slots 4 and silos 8 in the order determined by the optimization process of the present invention. In addition, if the facility is notified of changes in the railroad schedule, the process of this embodiment of the invention may be repeated for a new set of incoming train inputs to determine if the assignments must be changed to account for the schedule change. In addition, the operator may interactively and repetitively perform the optimization process with different values for the weighting factors or operating factors, as discussed above, for example to determine the sensitivity of the optimization to one or more of the factors.

It is to be understood that the optimization method described hereinabove may not find the exact optimal arrangement of incoming trains to coal bins. However, this method is highly advantageous in that it can repeatably find at least a very good solution, without being subject to such problems as local extrema and the like.

The present invention thus provides many important advantages in solving the problem of scheduling the delivery of non-uniform inventory to customers with different specification demands. Firstly, the present invention provides an automated scheduling function and system to replace the use of human estimation, and thus provides consistent maximization of revenue for the facility. Secondly, the present invention allows for the optimization of the scheduling using non-linear fitness functions, including functions having infinite derivatives, thus avoiding being trapped at local extrema. In addition, the present invention optimizes the scheduling in a manner that can consider a fitness function that depends upon factors and inputs of various types (in the above example, these factors include revenue, latency time, and plow moves), as well as a fitness function that may be modified under certain conditions (e.g, the cost of Trona additive). Furthermore, the present invention can account for threshold criteria in its optimization, such as whether the specification limits are met for a particular assignment.

It has been observed that the method described hereinabove can be performed quickly by data processing equipment having modest performance by modern standards (e.g., on the order of a few seconds using a 486-based personal computer). Accordingly, the present invention may be readily and inexpensively implemented at remote locations, such as at a coal mine.

Besides the application of the present invention to a coal delivery facility, it is further contemplated that the present invention may also be applied to other situations in which non-uniform inventory is to be delivered to recipients having differing requirements. An example of such a situation is the scheduling of natural gas flow in a pipeline network.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of scheduling the delivery of product from a plurality of locations, wherein a first measurement parameter of the product varies among the plurality of locations, comprising the steps of:

identifying a plurality of recipients, each having a revenue function associated with the first measurement parameter for the product;

randomly generating a first generation of assignment sequences, each assignment sequence in the generation assigning each of the plurality of recipients to one of the plurality of locations;

determining a fitness function value for each of the assignment sequences by evaluating a fitness function, wherein the fitness function comprises the sum of the revenue functions for each of the recipients in the assignment sequence, evaluated for each of the recipients according to the first measurement parameter for the product at the location assigned in the assignment sequence;

then producing a succeeding generation of assignment sequences according to a genetic algorithm;

repeating the step of determining a fitness function value, for each of the assignment sequences in the succeeding generation; and identifying the assignment sequence having the highest fitness function value.

2. The method of claim 1, further comprising:

after the step of repeating the step of determining a fitness function value, determining whether a convergence limit has been satisfied;

wherein the step of identifying the assignment sequence having the highest fitness function value is performed responsive to determining that the convergence limit was satisfied;

and further comprising:

responsive to determining that the convergence limit was not satisfied, repeating the steps of:
producing a succeeding generation of assignment sequences; and
determining a fitness function value for each of the assignment sequences in the succeeding generation.

3. The method of claim 1, wherein the step of producing a succeeding generation of assignment sequences comprises:

creating a probability value for each of the assignment sequences in the first generation by determining the fractional contribution of each assignment sequence in the generation to the sum of the fitness function values for the assignment sequences in the generation;

selecting parent sequences from the first generation according to the probability values;

randomly selecting pairs of parent sequences; and crossing over the selected pairs of parent sequences relative to one another at a selected digit position to produce the succeeding generation.

4. The method of claim 1, wherein a second measurement parameter of the product varies among the plurality of locations;

wherein each of the plurality of recipients has a threshold value for the second measurement parameter;

and wherein the step of determining the fitness function value further comprises:

for each recipient in each of the assignment sequences in the generation, comparing the threshold value for the second measurement parameter to the second measurement parameter of the product at the location assigned in the assignment sequence; and discarding any assignment sequence in which the second measurement parameter of the product does not satisfy the threshold value for the second measurement parameter for any of its recipients.

5. The method of claim 1, wherein the plurality of locations are arranged in first and second groups;

wherein the recipients are to be scheduled to receive product in a sequential manner; and wherein only a single recipient can receive product from any of the locations in the first group at a time.

6. The method of claim 5, wherein the recipients are to arrive at the plurality of locations at various times.

7. The method of claim 5, wherein the fitness function comprises a weighted sum of the sum of the revenue functions for each of the recipients in the assignment sequence, with a time value corresponding to delay of recipients in the assignment sequence resulting from assignment to one of the plurality of locations in the first group while a prior recipient is receiving product from another of the plurality of locations in the first group.

8. The method of claim 7, further comprising:

assigning a first weighting factor to the sum of the revenue functions for each of the recipients in the assignment sequence; and assigning a second weighting factor to the time value.

9. A method of delivering coal to a sequence of coal recipients, wherein the coal is stored in a plurality of bins, wherein the coal at the plurality of bins has a different energy yield, and wherein each of the coal recipients corresponds to a different revenue function based upon the energy yield of the coal delivered, comprising the steps of:

randomly generating a first generation of assignment sequences, each assignment sequence in the generation assigning each of the plurality of coal recipients to one of the plurality of bins;

determining a fitness function value for each of the assignment sequences by evaluating a fitness function, wherein the fitness function comprises the sum of the revenue functions for each of the coal recipients in the assignment sequence, evaluated for the energy yield of the coal at the bin assigned in the assignment sequence;

then producing a succeeding generation of assignment sequences according to a genetic algorithm;

repeating the step of determining a fitness function value, for each of the assignment sequences in the succeeding generation;

identifying the assignment sequence having the highest fitness function value; and delivering coal to the coal recipients according to the assignment sequence having the highest fitness function value.

10. The method of claim 9, wherein the plurality of bins are arranged in first and second groups;

wherein only a single coal recipient at a time may receive coal from any of the bins in the first group;

and wherein the fitness function comprises a weighted sum of the sum of the revenue functions for each of the coal recipients in the assignment sequence, with a time value corresponding to delay of coal recipients in the assignment sequence resulting from assignment to one of the bins in the first group while a prior coal recipient is receiving product from another of the bins in the first group.

11. The method of claim 9, further comprising:

assigning a first weighting factor to the sum of the revenue functions for each of the coal recipients in the assignment sequence; and assigning a second weighting factor to the time value.

12. The method of claim 9, wherein each of the coal recipients is a coal train.

13. The method of claim 9, wherein a contaminant parameter of the coal varies among the plurality of bins;

wherein each of the plurality of coal recipients has a maximum contaminant threshold;

and wherein the step of determining the fitness function value further comprises:

for each coal recipient in each of the assignment sequences in the generation, comparing the maximum contaminant threshold to the contaminant parameter of the coal at the bin assigned in the assignment sequence; and discarding any assignment sequence in which the contaminant parameter of the coal exceeds the maximum contaminant threshold for any of its coal recipients.

14. The method of claim 9, further comprising:

after the step of repeating the step of determining a fitness function value, determining whether a convergence limit has been satisfied;

wherein the step of identifying the assignment sequence having the highest fitness function value is performed responsive to determining that the convergence limit was satisfied;

and further comprising:

responsive to determining that the convergence limit was not satisfied, repeating the steps of:
producing a succeeding generation of assignment sequences; and
determining a fitness function value for each of the assignment sequences in the succeeding generation.

15. The method of claim 9, wherein the step of producing a succeeding generation of assignment sequences comprises:

creating a probability value for each of the assignment sequences in the first generation by determining the fractional contribution of each assignment sequence in the generation to the sum of the fitness function values for the assignment sequences in the generation;

selecting parent sequences from the first generation according to the probability values;

randomly selecting pairs of parent sequences; and crossing over the selected pairs of parent sequences relative to one another at a selected digit position to produce the succeeding generation.

16. The method of claim 9, wherein the sodium concentration of the coal varies among the plurality of bins;

wherein each of the plurality of coal recipients has a minimum sodium concentration;

and wherein the step of determining the fitness function value further comprises:

for each coal recipient in each of the assignment sequences in the generation, comparing the minimum sodium concentration to the sodium concentration of the coal at the bin assigned in the assignment sequence;

for each assignment sequence having a recipient for which the minimum sodium concentration is not met by the sodium concentration of the coal at the bin assigned in the assignment sequence, modifying the fitness function value by an amount corresponding to the cost of sodium additive necessary to be applied to the coal at the assigned bin.

17. The method of claim 9, further comprising:

prior to the randomly generating step, assigning one of the plurality of coal recipients to one of the plurality of bins.

18. The method of claim 9, further comprising:

prior to the randomly generating step, eliminating one of the plurality of bins from consideration.

* * * * *